Aug. 24, 1954 W. H. WANNAMAKER, JR 2,687,504
FOLLOW-UP TYPE OF MEASURING APPARATUS
Filed March 6, 1952
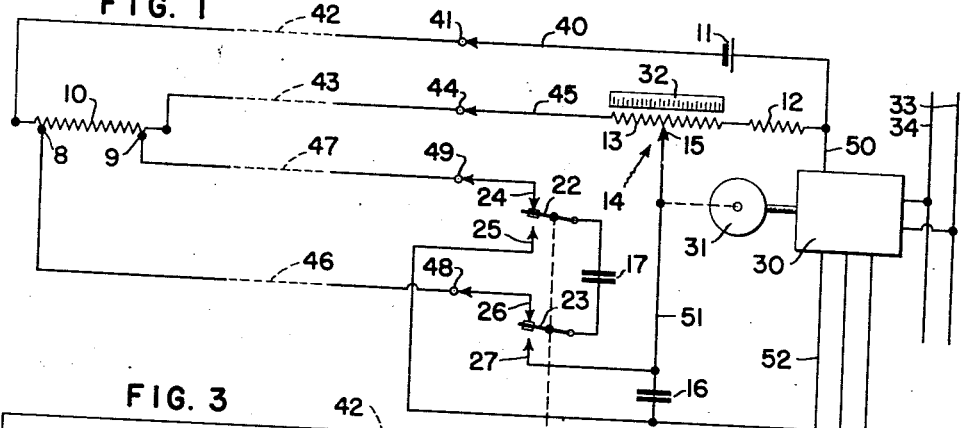
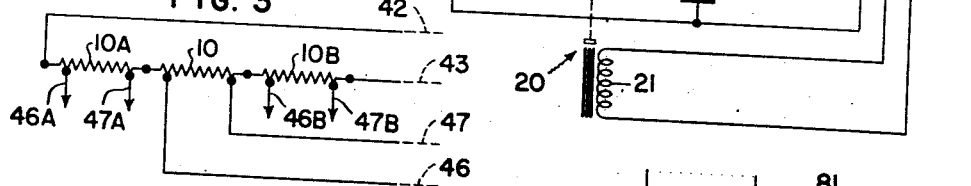
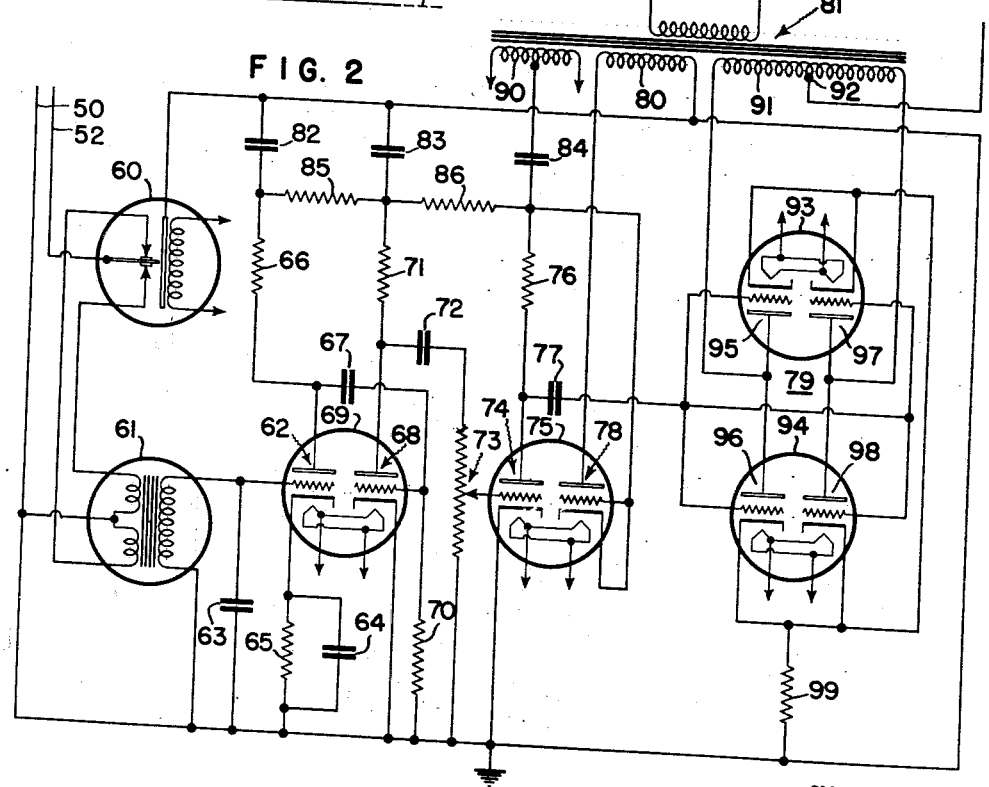
INVENTOR.
WILLIAM H. WANNAMAKER JR.
BY
Arthur H. Swanson
ATTORNEY Patented Aug. 24, 1954

2,687,504

UNITED STATES PATENT OFFICE 2,687,504

FOLLOW-UP TYPE OF MEASURING APPARATUS

William H. Wannamaker, Jr., Philadelphia, Pa., assignor to Minneapolis-Honeywell Regulator Company, Minneapolis, Minn., a corporation of Delaware Application March 6, 1952, Serial No. 275,065

16 Claims. (Cl. 318—28)

The present invention relates to a new and improved measuring apparatus for measuring the impedance of a remotely positioned variable sensing element. More particularly, the present invention is concerned with an electrical measuring apparatus especially adapted to measure the value of an remotely positioned impedance element of low value and characterized by its linearity of response and freedom from errors due to the length of the interconnected electrical leads or variations in circuit contact resistances.

A general object of the present invention is to provide a new and improved measuring apparatus for a remotely positioned electrical impedance type variable sensing element.

A further object of the present invention is to provide an improved sensing element impedance measuring apparatus where the element is located at a remote position and the measurement is independent of the length of the interconnected electrical leads.

Another object of the present invention is to provide a new and improved apparatus for measuring the resistance of a remotely positioned resistance bulb where the electrical potential existing across the resistance bulb is used to charge a condenser and the charge on said condenser is compared with a known potential on an adjustable balancing potentiometer.

Still another object of the present invention is to provide an improved measuring apparatus for a remotely positioned variable resistance bulb where the resistance bulb is connected to a source of potential thru a balancing slidewire and the potential across the resistance bulb is used to charge a condenser which charge is compared with a known potential on the potentiometer.

A still further object is top rovide a new and improved measuring apparatus for a remotely positioned variable resistance bulb where a condenser is alternately connected to the resistance bulb and to a potential comparison circuit which includes an adjustable balancing slidewire which is adjusted by motor means to an equal potential point with said condenser.

Still another object of the present invention is to provide a multiple sensing unit arrangement incorporating the above set forth objects wherein the required number of interconnecting leads is kept at a minimum.

In many applications of a variable or condition measuring or recording apparatus it is necessary to locate the condition or variable sensing elements at a position remote from the recording or measuring apparatus. When remotely positioned electrical impedance type sensing elements are utilized it is essential that the measuring circuit respond only to the impedance of the sensing element in order for an accurate measure of the impedance to be obtained regardless of the remoteness of the sensing element or the length of the interconecting electrical leads. In a sensing element impedance measuring apparatus where a balancing slidewire having an adjustable slider is used, it is also essential that the measurement be independent of any slider contact resistances. Where electrical switches are used in the apparatus, the measurement must not be affected by contact resistance.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Of the drawings:

Fig. 1 is a diagrammatic showing of one embodiment of the invention;

Fig. 2 illustrates a form of signal converting and amplifying circuit which may be used with the embodiment shown in Fig. 1; and Fig. 3 shows one method of incorporating a plurality of sensing units in the embodiment shown in Fig. 1.

Referring to Fig. 1, the numeral 10, for purposes of illustration, represents a temperature sensitive resistance bulb whose electrical impedance or resistance varies in accordance with changes in temperature. It will be understood that the resistance bulb 10 may be made to vary in accordance with other variable factors such as flow, level, etc. The impedance of this resistance bulb, in accordance with the principles of the present invention, may be relatively low in value. In one particular embodiment of the present invention, the resistance bulb 10 was made of copper, and had a ten ohm resistance with a four ohm change in a 100° C. temperature span. This value and type of bulb was selected because of this type of measuring apparatus which was utilized. Lower resistance bulbs can be utilized when desired, the only limitation being the sensitivity of the voltage detecting element of the associated measuring apparatus, which as those skilled in the art know, may be exceedingly sensitive. The resistance bulb 10 has a pair of potential connection points at 8 and 9 which are generally placed upon the resistance bulb, after it has been formed on a suitable bobbin, at precise points so that the resistance between the points will be exactly that desired.

This resistance bulb 10 is connected in a series circuit with a suitable source of unidirectional potential 11 by means of a ballast resistor 12 and a suitable slide wire resistor 13 of a balancing potentiometer 14. The potentiometer 14 has an adjustable tap or slider 15 cooperating with the slidewire 13. The ballast resistor 12 is selected to have a resistance which is equal to the cold temperature resistance of the resistance bulb 10, when the resistance bulb 10 has a positive temperature coefficient of resistance, in order that the balancing potentiometer may have its balancing adjustments originating from an end or zero position.

For determining the electrical potential across the resistance bulb 10, there is provided a condenser 16 which is arranged to assume a potential corresponding to that across the resistance bulb 10. The charging of the condenser 16 is effected by the alternate switching of a further condenser 17 between the resistance bulb 10 and the condenser 16. This switching function is accomplished by a double pole double throw vibrator 20 having a driving coil 21 which drives a pair of blades 22 and 23. The blade 22 cooperates with a pair of contacts 24 and 25 while the blade 23 cooperates with a pair of contacts 26 and 27.

For comparing the electrical potentials on the condenser 16 with those on the balancing potentiometer 14 there is provided a converter-amplifier 30, shown in detail in Fig. 2. The amplifier 30 is arranged to reversibly drive an alternating current motor 31 which is connected to adjust the position of the slider 15 upon the slidewire 13. The slider 15 cooperates with a suitable indicating scale 32 to give an indication of the magnitude of the resistance of the resistance bulb 10 and therefore the magnitude of the variable, such as temperature, which may be affecting the resistance bulb. Power for the amplifier 30 may be obtained from a suitable source of power, not shown, by connecting leads 33 and 34.

The signal converting and amplifying apparatus shown in Fig. 2 comprises a vibrator 60 which cooperates with a transformer 61 to convert any direct current signals appearing on leads 50 and 52 into an alternating current signal on the output of transformer 61. The phase of this alternating signal is dependent upon the direct current polarity on the input leads 50 and 52 and its magnitude is dependent upon the magnitude of the input direct current signal. The output of transformer 61 is applied to the input of triode 62 which is one-half of a dual triode tube 69. This triode has a condenser 63 connected between the input grid and ground and a parallel connected condenser 64 and resistor 65 in the cathode circuit serving as a cathode bias for the triode section 62. A resistor 66 functions in the normal manner as a load resistance for the triode. The output of the triode 62 is passed through a coupling condenser 67 to the input triode 68 which is the other half of the dual triode tube 69. The input grid of this triode is connected by a resistor 70 to ground while a resistor 71 acts as a load resistor for the triode 68. The output of the triode 68 is coupled by way of a coupling condenser 72 and a signal limiting potentiometer 73 to the input of a triode section 74, the latter of which is one-half of a further dual triode tube 75. The triode section 74 has a load resistor 76 in the anode circuit. A coupling condenser 77 couples the output of the triode 74 to the succeeding output stage 79.

The right half section of the triode tube 75 is connected as a diode to serve as a rectifier 78. This rectifier acts upon an alternating current voltage received from a secondary 80 of an input transformer 81 and converts the alternating current from the transformer secondary into a pulsating direct current. This pulsating direct current is filtered by the combined action of the condensers 82, 83 and 84 and the resistors 85 and 86.

The transformer 81 also has a secondary 90 which is arranged for connection to the heaters of the tubes of the apparatus and to the vibrating coil of vibrator 60 as well as the coil 21 of the vibrator 20, shown in Fig. 1. A further secondary 91 is center tapped at 92 and supplies power to the amplifier output stage 79. The output stage includes two dual triode tubes 93 and 94. A triode section 95 of tube 93 is connected in parallel with a triode section 96 of tube 94 while a triode section 97 of tube 93 is connected in parallel with a triode section 98 of tube 94. Anodes of each of the two parallel connected sections are connected to the end terminals of the transformer secondary 91 while the cathodes are grounded by a cathode resistor 99.

For a further and more complete explanation of the operation of a converter-amplifier, of the type shown in Fig. 2, reference should be made to the Wills Patent, 2,423,540, issued July 8, 1947.

As those skilled in the art will understand, a direct current signal on the input leads 50 and 52 is converted into an alternating current signal on the output of the transformer secondary of the transformer 61. The phase of the output signal on the transformer 61 will be dependent upon the polarity of the direct current signal which appears on the input conductors 50 and 52. The alternating current signal is amplified by the triode sections 62, 68 and 74 in the order named. The amplified signal is then applied to the output tubes 93 and 94 which will produce a current flow through tap 92 which will be in one phase or the other depending upon the polarity of the direct current input signal. This output current flow is fed to the motor 31, shown in Fig. 1, and will drive this motor in a direction corresponding to the phase of the signal applied thereto.

In considering the operation of the apparatus shown in Fig. 1, it will first be noted that the direct current source of potential 11 is connected to the resistance bulb 10 by a circuit which may be traced through conductor 40, connecting terminal 41, a relatively long connecting lead 42, resistance bulb 10, a relatively long connecting lead 43, connecting terminal 44, conductor 45, slidewire resistor 13, and ballast resistor 12 back to the source 11. The current flow in this last traced circuit will establish a potential drop across the resistance bulb 10 as well as that across the slidewire resistor 13 and ballast resistor 12. In the balanced condition of the apparatus, the potential drop across the resistance bulb 10 is equal and opposite to the sum of the potential drops across the ballast resistor 12 and a portion of the potential drop across the slidewire resistor 13 determined by the position of the slider 15.

As shown, the condenser 17 is connected in parallel with resistor 10 by the vibrator 20 during the regularly recurring periods when blades 22 and 23 engage their respective contacts 24 and 26. The connection from resistor 10 to the contacts 24 and 26 is by the potential leads 46 and 47, which may correspond in length to the length of the leads 42 and 43, as well as by connecting terminals 48 and 49. During the alternate periods when the vibrator blades 22 and 23 disengage contacts 24 and 26 and engage contacts 25 and 27, and the condenser 17 is disconnected from resistor 10 and connected in parallel with condenser 16. The condenser 16 is thus made to assume the same potential as that across the condenser 17 and therefore the potential drop across the resistance bulb 10.

The condenser 16 is continuously connected in series with the slidewire resistor 13 and ballast resistor 12 to the input of the amplifier 30 in a circuit that may be traced from amplifier input lead 50, through ballast resistor 12, the right hand portion of slidewire resistor 13, slider 15, conductor 51, condenser 16, and amplifier input lead 52. The direct current potential on condenser 16 is in opposition to the direct current potentials across the resistor 12 and the right hand portion of the slidewire 13. At balance there is no net input potential to the amplifier 30. The motor 31 will then remain stationary. If the resistance of resistor 10 should change, the potential on condenser 17, and therefore, the potential on condenser 16 will correspondingly change. This change will create an unbalanced condition on the input of the amplifier 30 which then operates to energize the motor 31 to drive the slider 15 to a new equal potential point which will correspond to the new potential on the condenser 16. If the resistance bulb 10 is of the type which varies linearly with changes in the magnitude of the controlling variable, the movement of slider 15 may be linear and the scale 32 may be linear.

It will be noted in the foregoing description that only the potential drop across the resistance bulb 10 is compared with the potential drop across the resistor 12 and the right hand portion of the slidewire resistor 13. Since the current flow from the source of potential 11 is the same through both resistor 10 and the slidewire resistor 13 and the resistor 12, it will be apparent that at the null or balanced position any changes in the current flow from source 11 will cancel out so that the current flow may be neglected. Thus, in effect, a direct resistance measure is made of the resistance value of bulb 10. Since the current flow may be neglected, the measure of the resistance of the resistance bulb 10 is independent of the value or changes in value of the resistance of the interconnecting leads 42 and 43.

Insofar as the resistance of the leads 46 and 47 is concerned, it will be noted that the resistance of these will be in series with the leakage resistance of the condenser 17 which is extremely high compared to the lead resistance. In this arrangement, the lead resistance has no practical effect on the net potential or charge on the condenser 17. The only time that the lead length of leads 42 and 43 or 46 and 47 will have any effect will be when the charge on the condenser 17 is changing. Under these circumstances, the lead resistance may delay the changing of the charge on the condenser 17. However, in most applications, this delay may be neglected since the accuracy at balance is the most important factor. The same applies to any normal contact resistance which contacts 24, 25, 26 or 27 may have, and therefore, this contact resistance or changes therein do not introduce error into the measurement. The measurement made is also independent of the contact resistance of slider 15 on the slidewire resistor 13. This for the reason that little or no current will flow through the contact resistance because of the connection of this resistance in series with the high leakage resistance of condenser 16. Thus, only a potential comparison is made and any contact resistance may be disregarded since such resistance will not act as a source of potential in the comparison circuit.

The apparatus shown in Figure 3 is a modification of that shown in Figure 1. The modification involves the connecting of additional temperature sensitive resistance bulbs 10A and 10B in series with the bulb 10 and the leads 42 and 43. Thus, the current flow from the direct current source of potential 11, of Figure 1, passes through all of the sensing elements and only two connecting leads are required to supply current to these elements. Each of the sensing elements 10A and 10B has suitable connecting leads 46A and 47A, and 46B and 47B, respectively, which are arranged for connection to connecting terminals 48 and 49, shown in Figure 1. The elements may be alternately switched into the potential comparison circuit by either manual or automatic means, not shown. If the switching is accomplished at the remote position, it is necessary to provide only two potential leads 46 and 47. If the switching is accomplished at the indicating instrument, then separate potential leads are required for each bulb.

In operation, the apparatus of Figure 3 functions in the same general manner as that of Figure 1. When the sensing bulb 10 is connected to the potential comparison circuit, the slider 15, of Figure 1, will be adjusted to a potential which is equal to that on the bulb 10. When the bulb 10A is connected to the potential comparison circuit, the slider 15 will be adjusted to a potential corresponding to the potential on bulb 10A. The same will be true with bulb 10B. It will be noted that while the total resistance of the series circuit may be changed by the addition of resistance bulbs 10A and 10B, the change in current flow will not change the ultimate adjustment of slider 15 since the slider potential is being balanced against that on the resistance bulb then connected to the comparison circuit. Since the current flow through the element being checked is the same as that through the balancing slidewire resistor 13, the current may be neglected and the adjustment of slider 15 will be a direct measure of resistance.

It can thus be seen that in Figure 2, the wiring of a plurality of remote resistance bulbs or elements is simplified and kept at a minimum since only two leads are required to supply power to any number of elements or sensing resistance bulbs.

From the foregoing it will be seen that there has been provided a new and improved impedance measuring apparatus for measuring the resistance of a remotely positioned resistance bulb in which the measurements made are independent of the length of the interconnecting leads as well as any contact resistance in the apparatus.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is as follows:

1. Apparatus for measuring resistance variations of a variable sensing resistor, comprising, a source of potential, a slidewire resistor having a fixed resistance and an associated tap, circuit means connecting said source and said slidewire resistor in a series circuit to said variable sensing resistor, a condenser, means directly connecting said condenser in parallel with said sensing resistor so that said condenser is operatively connected to assume a potential which varies with the potential drop across said sensing resistor, and circuit means connected to said condenser and operative to compare the potential on said condenser with a potential on said tap of said slidewire resistor.

2. Apparatus for measuring resistance variations of a variable sensing resistor, comprising, a source of potential, means including a slidewire resistor of fixed magnitude having an adjustable tap thereon and connecting said source to said resistor, a condenser arranged for direct connection to said sensing resistor and adapted, when so connected, to assume a potential which is the potential across said resistor and which is a function of the resistance of said sensing resistor, and circuit means connected to compare the potential on said condenser with the potential on said tap.

3. Apparatus for measuring resistance variations of a variable sensing resistance, comprising, a source of potential, means including a slidewire resistor having an adjustable tap thereon connecting said source to said resistor, a condenser arranged for direct connection to said sensing resistor, said condenser when so connected assuming a potential which is the potential on said resistor and is a function of the resistance of said sensing resistor, a potential comparison circuit for comparing the potential on said condenser with that on said tap, and periodically operating switching means arranged to connect said condenser alternately between said sensing resistor and said comparison circuit.

4. Apparatus for measuring resistance variations of a variable sensing resistor, comprising, a source of potential, means including a slidewire resistor having an adjustable tap thereon and connecting said source to said resistor so that there will be a potential drop across said resistor, a condenser arranged for direct connection to said sensing resistor, said condenser, when so connected, assuming the potential drop across said resistor which is a function of the resistance of said sensing resistor, a potential comparison circuit for comparing the potential on said condenser with that on said tap, said potential comparison circuit comprising said slidewire resistor and said tap and a second condenser which is arranged to assume a potential proportional to that on said first named condenser, and periodically operating switching means arranged to alternately connect said first named condenser to said sensing resistor and to said comparison circuit.

5. Apparatus for measuring resistance variations of a variable sensing resistance, comprising, a source of potential, means including a slidewire resistor of fixed magnitude having an adjustable tap thereon and connecting said source to said resistor so that said resistor will have a potential drop thereacross, a condenser arranged for connection to said sensing resistor, said condenser assuming the potential drop across said resistor which is a function of the resistance of said sensing resistor, a potential comparison circuit for comparing the potential on said condenser with that on said tap, said potential comparison circuit comprising said slidewire resistor and said tap and a second condenser which is arranged to assume a potential proportional to that on said first named condenser, and periodically operating switching means for alternately connecting said first named condenser in parallel with said sensing resistor and said second condenser.

6. Apparatus for measuring the impedance of a variable sensing element located at a remote position with respect to the measuring apparatus, comprising, a source of potential, a slidewire resistor having a tap associated therewith, means connecting said slidewire resistor and said source in series to said element, said means comprising a first pair of relatively long connecting leads, a condenser arranged for connection to said element by means including a second pair of relatively long connecting leads and adapted, when so connected, to assume the potential drop which is across said element and is dependent upon the electrical impedance of said element and which is independent of the length of said first or second pair of conducting leads, and electrical circuit means connected to compare the potential on said condenser with the potential on said tap.

7. Apparatus for measuring resistance variations of a variable sensing resistor, comprising, a source of potential, means including a slidewire resistor having an adjustable tap thereon connecting said source to said resistor so that said resistor will have a potential drop thereacross, a condenser arranged for connection to said sensing resistor and adapted, when so connected, to assume the potential across said resistor which is a function of the resistance of said sensing resistor, a potential comparison circuit for comparing the potential on said condenser with that on said tap, said potential comparison circuit comprising said slidewire resistor and said tap and a second condenser which is arranged to assume a potential proportional to that on said first named condenser, periodically operating switching means arranged to alternately connect said first named condenser between said sensing resistor and said comparison circuit, and motor means connected to said comparison circuit and arranged to drive said tap so that the magnitude of the potential on said tap will correspond to the magnitude of the potential on said second condenser.

8. Apparatus for measuring the impedance of a variable sensing element located at a remote position with respect to the measuring apparatus, comprising, a source of potential, a slidewire resistor having a tap associated therewith, means connecting said resistor and said source in series to said element so that said element will have a potential drop thereacross, said means comprising a first pair of relatively long connecting leads, a condenser arranged for direct connection to said element by means including a second pair of relatively long connecting leads, said condenser, when so connected, assuming a potential which is dependent upon the electrical impedance of said element and independent of the length of said first and second pair of leads, electrical circuit means for comparing the potential on said condenser with the potential on said tap, and switching means comprising a double pole-double throw vibrator arranged to alternately connect said condenser to said second pair of leads and said electrical circuit means.

9. Apparatus for measuring the resistance of a variable sensing element located at a remote position with respect to the measuring apparatus, a direct current source of potential, a slidewire resistor having a tap associated therewith, means connecting said direct current source and said resistor in a series circuit to said element, said connecting means comprising a first pair of relatively long electrical leads, a first condenser arranged for connection to said element by means of a second pair of relatively long connecting leads, said condenser, when so connected, assuming a potential which is dependent upon the electrical impedance of said element, a second condenser, vibratory switching means adapted to alternately connect said first condenser to said second pair of leads and in parallel to said second condenser so that said second condenser will assume, when so connected, a potential corresponding to that on said first, means connecting said tap and a portion of said resistor in series with said second condenser to a second vibratory switching means converting any direct current potential difference between said second condenser and said tap to alternating current, and alternating current electrical motor means connected to the output of said second vibratory switching means and driving said tap to an equal potential point with the potential on said second condenser.

10. Apparatus for measuring the impedance of a remotely positioned impedance element, comprising in combination, a source of potential connected in series circuit with said element, a slidewire resistor having a tap associated therewith, means connecting said resistor in said series circuit, a first condenser, a control signal utilization circuit having an input including a portion of said resistor, said tap, and said first condenser, a second condenser, and switching means adapted to alternately connect said second condenser directly in parallel with said element and said first condenser.

11. Apparatus for measuring the impedance of a remotely positioned impedance element, comprising, a source of potential connected in a series circuit with said element, a balancing impedance connected in said series circuit, a condenser, a control signal utilization circuit having an input including said balancing impedance, switching means arranged to alternately connect said condenser directly in parallel with said element and said input of said utilization circuit, and adjusting means for said balancing impedance controlled by said utilization circuit.

12. Apparatus for measuring resistance variations of a variable sensing resistor, comprising, a source of potential, means including a balancing impedance connecting said source to said sensing resistor, a condenser arranged for parallel connection with said sensing resistor, said condenser, when so connected, assuming a potential which is a function of the resistance of said sensing resistor, and signal utilization circuit means connected to directly compare the potential on said condenser with a potential on said balancing impedance.

13. Apparatus for measuring the resistance of a remotely positioned resistance bulb, said resistance bulb having a relatively low resistance and a resistance change which is linear with respect to linear changes in the value of a controlling variable, comprising a source of potential, means including a balancing impedance connecting said source to said resistance bulb, a condenser adapted to be connected in parallel with said resistance bulb to assume, when so connected, a potential which is a function of the resistance of said resistance bulb, circuit means connected to compare directly the potential on said condenser with a potential on said balancing impedance, and adjusting means controlled by said circuit means to adjust said balancing impedance so that linear changes in the controlling variable acting on said resistance bulb are balanced by linear changes in said balancing impedance.

14. Temperature measuring apparatus, comprising, a relatively low resistance copper sensing element, a direct current source of power, a balancing resistor connecting said source in series with said element, a condenser arranged for parallel connection to said element and, when so connected, assuming a potential which is proportional to the resistance of said element, circuit means adapted to compare directly the potentials on said condenser and said balancing resistor, said circuit means being unaffected by the length of interconnecting electrical leads between said element and said source or said element and said condenser, and adjusting means controlled by said circuit means arranged to cause the potential on said balancing resistor to be equal in magnitude to the potential on said condenser.

15. In apparatus for measuring the resistance of a plurality of remotely positioned variable sensing resistance bulbs, the combination comprising, a source of potential, a balancing impedance, means including a pair of relatively long connecting leads connecting all of said resistance bulbs, said balancing impedance, and said source of potential in a series circuit, and a potential comparison circuit and means including a further pair of relatively long connecting leads associated with each of said resistance bulbs arranged to connect said respective bulb to said comparison circuit, said potential comparison circuit comprising means for measuring the resistance of said resistance bulbs independently of the length of all of said relatively long leads.

16. Apparatus for measuring the value of a plurality of variables at a position remote from an indicating apparatus, comprising, a plurality of variable impedance sensing elements connected in series, a source of potential, a balancing impedance, a pair of connecting leads serially connecting said source of potential to said balancing impedance, and said serially connected elements, a pair of potential leads associated with each of said elements, a potential comparison circuit including said balancing impedance, and a condenser arranged for alternate parallel connection between a selected pair of said potential leads and said potential comparison circuit.

References Cited in the file of this patent

UNITED STATES PATENTS

| Number | Name | Date |
| --- | --- | --- |
| 1,733,585 | Dehn | Oct. 29, 1929 |
| 2,110,523 | Geyger | Mar. 8, 1938 |
| 2,456,499 | Fritzinger | Dec. 14, 1948 |
| 2,548,276 | Weisbecker | Apr. 10, 1951 |
| 2,648,037 | Harrison | Aug. 4, 1953 |